३,७३४,७६८
METAL COATED WITH A SILICONE ELASTOMER CONTAINING MONOCELLULAR PARTICLES FOR ABLATIVE PURPOSES
Frank A. Smith, 1412 Jay, Midland, Mich. 48640
No Drawing. Filed Oct. 29, 1970, Ser. No. 85,231
Int. Cl. B32b 15/08, 27/20
U.S. Cl. 117—132 BS 6 Claims

ABSTRACT OF THE DISCLOSURE

A metal substrate coated with a silicone elastomer containing specific quantities of monocellular thermoplastic resinous polymeric particles which encapsulate a volatile liquid raising agent, is useful for protecting aerospace vehicles and support equipment from the deleterious effects of turbulent gases and severe temperatures encountered in the operation of said vehicle.

---

This invention relates to the use of a novel low density filler for organosiloxane elastomers employed as ablative coatings for aerospace vehicles and more particularly to the use of monocellular thermoplastic resinous polymeric particles as the pertinent low density filler.

Ablative coatings are used in various portions of aerospace vehicles as well as support equipment and their general function is to provide a protective mechanism or the like whereby the skin and other parts of the vehicle are not adversely affected by the hot turbulent gases and high temperatures which the vehicle and support equipment necessarily encounters. The high temperatures occur when the vehicle passes at high speed through the atmosphere, e.g., especially when the vehicle re-enters the earth's atmosphere upon return of its flight. In addition, numerous other portions of the vehicle including its support equipment may be affected by the strong flame that is initiated by rocket propellant substances. In the latter case, the outside of the nozzles, the end of the vehicle, the inside of the fuel compartment, and support equipment external to the vehicle which is necessary for launch are subjected to tremendous temperatures and pressures which are generated by this flame which is capable of destroying even the most efficient and best high temperature alloys of iron, titanium, chromium, nickel, beryllium and others, unless they are adequately protected in some manner.

For applications involving long term, low to moderate heating rates and shear environment, e.g., manned re-entry of aerospace vehicles and recoverable boosters, ordnance carried externally on supersonic aircraft, etc., it is necessary for these ablative coatings to possess low thermal conductivity and low density. Heretofore, to achieve these purposes, syntactic materials have been utilized employing hollow particles such as glass, silica, carbon, and the like. However, to obtain the desired properties, high concentrations of the hollow particles are required to the extent that handling properties and fabricating techniques become extremely difficult. That is, the material is virtually impossible to apply absent the necessity of specialized and expensive equipment.

In accordance with the above, it is an object of the present invention to provide an effective ablative coating for use at temperatures above 1500° F., which can be conveniently applied to the appropriate surface absent the costly expense which necessarily accompanies prior art techniques.

Another object of the instant invention is to provide an ablative coating employing a low density filler which has lower thermal conductivity than the aforementioned hollow particles used in the past.

It is a further object of the present invention to employ low density fillers which allow the ablative coating to have a higher degree of elasticity which enhances resistance to thermal shock and the physical protection afforded to a resilient coating.

These and other objects will become readily apparent from a consideration of the following detailed description of the invention.

This invention relates to a method for protecting the surfaces of aerospace vehicles and support equipment from the deleterious effect of gases at temperatures above 1500° F. which comprises coating said surfaces with a composition consisting of (A) A silicone elastomer,
(B) From 0 to 250 parts by weight of silica,
(C) From 0 to 15 parts by weight of a high temperature decomposing fiber which melts at a temperature above 1500° F.,
(D) From 1.0 to 50 parts by weight of a monocellular thermoplastic, resinous polymeric particle having a generally spherical shape and having encapsulated therein a discrete portion of a volatile liquid raising agent which becomes gaseous at a temperature below the softening point of the polymer, said parts of (B), (C), and (D) being based on each 100 parts by weight of organosiloxane polymer in (A).

Thus, in accordance with this invention there is provided a metal substrate having coated on the surface thereof the above described composition consisting of the components (A), (B), (C), and (D) in the stated proportions.

Metals which can be coated in accordance with the above can include alloys of iron, titanium, chromium, aluminum, nickel, beryllium, etc. These metals can be in sheet form, in cast or machine form, and could be in finished form, e.g., in the form of a nose cone or body of an aerospace vehicle.

For purposes of this invention, the silicone elastomer (A) is meant to include commercially available silicon elastomers well known in the art. Hence, silicon elastomers based on polymers of the general formula $[R_2SiO]$, in which R is a hydrocarbon or substituted hydrocarbon radical will suffice. Illustrative examples of R radicals are the methyl, vinyl, phenyl and 3,3,3-trifluoropropyl radical, among numerous others.

The silicone elastomers of this invention can also be heat curable or room temperature vulcanizing elastomers and can be cured by suitable vulcanizing agents well known in the art. Thus, curing can be effected by the use of standard curing agents which will vulcanize at temperatures below 90° C., or they can be cured by subjecting the coating to electromagnetic radiation or electron radiation, or they can be of the so-called room temperature curing type mentioned above. The latter, as is well known, fall into three main classes; namely, those cured by incorporating alkyl silicates and suitable catalysts, those cured by incorporating SiH compounds and vinyl on silicon in the presence of a platinum catalyst, and the one component room temperature curing elastomers in which the molecule contains a plurality of hydrolyzable groups such as acetoxy or oxime groups which react with the moisture of the atmosphere to effectively cure the siloxane.

Envisioned and contemplated within the scope of this invention are those elastomers which are disclosed in U.S. Pats. 2,560,498; 2,541,137; 2,561,177; 2,571,039; 2,658,882; 2,718,512; 2,721,857; 2,723,966; 2,728,743; 2,751,314; 2,759,904; 2,803,619; 2,811,408; 2,833,742; 2,842,520; 2,863,846; 2,902,467; 2,927,907; 2,956,032; 2,999,076; 3,006,878; 3,065,201; 3,122,522; 3,137,670; and 3,179,619, as well as countless others.

It is of importance to note that the room temperature vulcanizing elastomers are particularly suitable in the present invention since they can be conveniently applied and cured upon the surface of the aerospace vehicle or its support equipment with a minimum amount of time, labor and expense involved. A room temperature vulcanizing elastomer of the type defined in U.S. Pat. 3,268,359 was found to provide optimum ablative properties and the plurality of advantages desired herein.

Preferably, the silicone elastomers of this invention can also contain other fillers which aid in stabilizing the composition. These additional fillers include diatomaceous earth, crushed quartz and silicates such as aluminum silicate, aluminum magnesium silicate, clay and zirconium silicate and metal oxides such as $TiO_2$, ferric oxide and the like. Hence, it is apparent that other fillers which can be employed in this invention are conventional inorganic fillers normally used in organosiloxane elastomers.

The silica (B), may or may not be included in the ablative coating described herein. If ultimate low density is required the silica (B) is not employed; however, where a range of low densities is required relevant to certain specific applications, the silica (B) is used to obtain these densities. In addition, the silica (B) may be included to enhance other attendant properties such as greater shear resistance, tensile strength, etc.

High temperature decomposing fibers (C) which melt at a temperature above 1500° F. may or may not be employed depending upon the finished characteristics of the ablative coating which are desired.

The size of the high temperature decomposing fibers (if used) can range in length from 30 microns to 1 inch, and are preferably about 600 to about 1200 microns in length. The high temperature decomposing fibers orient themselves in scattered fashion throughout the coating and tend to tie the resultant char to the virgin material, thus preventing the coating from flaking off when the aerospace vehicle and its support equipment are subjected to the high temperatures and shear created by re-entry and turbulent gases.

Illustrative of the high temperature decomposing fibers which have been found to function herein include commercially available materials such as carbon, graphite, silica, nitrides, borides, oxides and silicates amongst others.

When the silica (B) and/or high temperature decomposing fibers (C) are used, it is critical that no more than 250 parts by weight and 15 parts by weight, respectively, based upon 100 parts by weight of organosiloxane polymer in the elastomeric material (A) be employed. If more than these amounts are included, the consistency of the coating is destroyed and other desirable properties, e.g., low thermal conductivity is adversely affected.

The presence of the thermoplastic, resinous polymeric particle having a generally spherical shape and having encapsulated therein a discrete portion of a volatile liquid raising agent which becomes gaseous at a temperature below the softening point of the polymer (D) is critical if the foregoing objects of the instant invention are to be achieved.

Although from 1.0 to 50 parts by weight of the particle (D) based upon the weight of the organosiloxane polymer in (A) may be employed, to obtain the optimum properties required, it is preferred that from about 5 to about 25 parts by weight be used.

The particles (D) used in accordance with this invention are readily prepared from a wide variety of materials. Advantageously, the particles are usually prepared by providing an aqueous dispersion of (1) organic monomeric materials suitable for polymerization to a thermoplastic resinous material having the desired physical properties, (2) a liquid blowing or raising agent which exerts little solvent action on the resulting polymer, which is employed in a quantity in excess of that which is soluble in the polymer, and (3) a dispersion stabilizing material which is utilized to maintain the dispersion, subsequently polymerizing the monomeric material to solid spherical particles having a quantity of the liquid blowing agent encapsulated therein as a distinct and separate phase.

A wide variety of organic materials may be employed. Typical of these are the alkenyl aromatic monomers. By the term "alkenyl aromatic monomers" is meant a compound having the general formula:

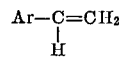

wherein Ar represents an aromatic hydrocarbon radical or an aromatic halohydrocarbon radical of the benzene series. Examples of such alkenyl aromatic monomers are styrene, o-methylstyrene, m-methylstyrene, p-methylstyrene, ethylstyrene, ar-vinylxylene, ar-chlorostyrene, or ar-bromostyrene. Various other styrene derived compounds may be employed such as vinylbenzylchloride, and p-tert.-butylstyrene.

The acrylate monomers alone or in combination with the alkenyl aromatic monomers may also be utilized. Such acrylate-type monomers include monomers of the formula:

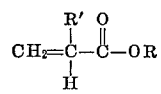

wherein R is hydrogen or an alkyl radical containing from about 1 to 12 carbon atoms and R' is hydrogen or methyl. Typical acrylate materials which may be used are methyl methacrylate, ethyl acrylate, propyl acrylate, butyl acrylate, butyl methacrylate, propyl methacrylate, lauryl acrylate, 2-ethylhexylacrylate, and ethyl methacrylate.

Copolymers of vinyl chloride and vinylidene chloride, acrylonitrile with vinyl chloride, vinyl bromide, and similar halogenated vinyl compounds may be incorporated. Esters, such as the vinyl esters having the formula:

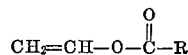

wherein R is an alkyl radical containing from 1 to 17 carbon atoms, may also frequently be employed with benefit. Typical monomers falling within this classification are vinyl acetate, vinyl butyrate, vinyl stearate, vinyl laurate, vinyl myristate, and vinyl propionate.

Beneficially, in certain instances and when using specific dispersing agents, it is frequently advantageous to incorporate in the polymeric material a portion of a copolymerizable acid. These acids also improve the geometric form of the particles and oftentimes provide increased adhesion of the resultant polymeric particles to various polar surfaces such as metal and wood.

Typical copolymerizable acids are acrylic acid, methacrylic acid, itaconic acid, citraconic acid, maleic acid, fumaric acid, and vinylbenzoic acid.

A wide variety of blowing or raising agents may be incorporated within the polymerization system. They can be volatile fluid-forming agents such as aliphatic hydrocarbons including ethane, ethylene, propane, propene, butene, isobutene, neopentane, acetylene, hexane, heptane, or mixtures of one or more such aliphatic hydrocarbons having a molecular weight of at least 26 and a boiling point below the range of the softening point of the resinous material when saturated with the particular blowing agent utilized.

Other suitable fluid-forming agents are the chlorofluorocarbon, e.g. $CClC_3F$, $CCl_2F_2$, $CClF_3$, $CClF_2-CClF_2$

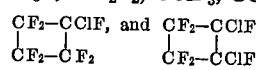

and tetraalkyl silanes such as tetramethyl silane, trimethylethyl silane, trimethylisopropyl silane and trimethyl-n-propyl silane. The boiling point of such foaming agents at atmospheric pressure should be about the same temperature range or lower than the softening point of the resinous material employed.

Suspensions of monomeric materials for the preparation of the particles are usually made employing a suspending agent such as a water-soluble gum e.g. methyl cellulose, gum agar, hydroxypropyl methylcellulose, carboxy methylcellulose, colloidal silica, and colloidal clays.

Usually, in order to initiate polymerization, a suitable catalyst, preferably of the oil-soluble variety, is incorporated within the monomeric system. Suitable catalysts include peroxide compounds and high energy ionizing radiation. Suitable organic peroxides include benzyl peroxide, lauryl peroxide, tert.-butyl peracetate, tert.-butyl perbenzoate, cumene hydroperoxide, and cumene ethyl peroxide.

In preparing the particles, it is desirable, although not necessary, to exclude oxygen and similar free radical chain-terminating materials from the system. This is readily accomplished by flushing the system with an inert atmosphere such as nitrogen.

Generally, in preparing the aqueous dispersions to be polymerized, the monomer and blowing agent constitute a major portion of the oil phase and are incorporated with water in a ratio of from about 1:1 oil-phase-to-water to about 1:6. Usually, the suitable dispersing agent is incorporated within the water phase and the monomer, blowing agent, and catalyst are mixed. It is beneficial to provide violent agitation if the resultant paricles are desired to have a small diameter.

If extremely small particles are desired, it may be necessary to use a homogenizer or similar device in order to obtain uniform control of particle size. It is frequently beneficial to utilize a limited coalescence technique in combination with a mechanical homogenizer or similar devices that will subject the dispersion to conditions of high shear prior to polymerization.

There are various additaments which may be made to the polymerization system. Encapsulation of a blowing agent may be obtained where the initial monomer charge contains a polymer dissolved therein, for example, 10–15 percent by weight polystyrene is readily dissolved in methyl methacrylate and is polymerized. Stabilizers, lubricants and similar substances which oftentimes are desirably incorporated into polymeric materials may be added with the monomer or blowing agent as desired.

The order of the addition of the constituents to the polymerization usually is not critical, but beneficially it is more convenient to add to a vessel the water and dispersing agent, then add the blowing agent to the monomer, and incorporate the oil-soluble catalyst in the monomer mixture, and subsequently add with agitation the monomer phase to the water phase. The blowing agent or raising agent must be present in a proportion which exceeds the solubility of such an agent in the polymer formed. This level usually is about 20 to 30 weight percent and, beneficially, is not less than about 20 volume percent. When suitable blowing agents having desirable solvent characteristics for the monomer system being utilized are employed in quantities less than about 20 volume percent, that is, based on the volume of the oil phase, separation frequently fails to occur and particles smaller in diameter than about 40 microns do not expand on heating.

When polymeric materials are utilized which have softening points below about 50° C., such as polyacrylates or acrylate copolymers which have a plasticizing monomer incorporated therein such as 2-ethylhexylacrylate, careful handling of the product is required. After polymerization in a pressure vessel if the product is to be isolated as an unexpanded particle the temperature of the reaction mixture, and the atmosphere in which it is being handled, must be at least about 5° below the softening temperature of the polymer. Otherwise, expansion will occur when the pressure is released from the polymerization vessel. In many instances where the desired product is the expanded bead, the polymerization vessel may be vented at a temperature above the softening temperature of the polymer and a slurry of expanded particles obtained which are readily separated from the liquid by flotation and dried by centrifugation and similar conventional methods.

The copolymers of styrene with from about 1 to about 4 percent by weight methacrylic acid, and the copolymers of styrene with 10 to 80 percent acrylonitrile are particularly advantageously employed. These compositions, when polymerized in accordance with the invention, provide a product which consists of about 100 percent spherical particles having symmetrically encapsulated therein a blowing agent. Also advantageous are those styrene copolymers which provide symmetrical encapsulation in at least 80 percent of the particles prepared. These polymers are copolymers of styrene with from about 15–40 percent by weight of vinyl benzyl chloride, also copolymers of styrene and from about 1 to 8 percent by weight of acrylic acid. Copolymers of styrene and about 2–10 percent of acrylonitrile also provide a product which shows over 80 percent symmetrical encapsulation. At least 80 percent symmetrical encapsulation is achieved in utilizing a polymer of acrylonitrile with from about 7 to about 60 percent by weight of vinylidene chloride. Vinyl benzyl chloride and copolymers of ortho-chlorostyrene with from about 1 to about 8 percent of acrylic acid also provide symmetrical encapsulation.

Particularly beneficial and advantageous for the preparation of spherical particles having a blowing agent symmetrically encapsulated are such monomer compositions as methyl methacrylate, copolymers of methyl methacrylate containing up to about 20 percent by weight of styrene, copolymers of methyl methacrylate and up to about 50 percent by weight of the combined monomers of ethyl methacrylate, copolymers of methyl methacrylate, and up to 70 percent by weight of ortho-chlorostyrene. These compositions provide a product which consists substantially of 100 percent of the particles showing symmetric encapsulation. Also advantageous and beneficial are those compositions which provide a product which has an excess of about 80 percent of the product as symmetrically encapsulated blowing agents. Methyl methacrylate materials comprising methyl methacrylate containing up to about 50 percent by weight of acrylonitrile, copolymers of methyl methacrylate containing up to about 20 percent paratertiarybutylstyrene, polymers of methyl methacrylate with up to about 40 percent vinyl acetate, and polymers of methyl methacrylate with up to about 20 percent butyl acrylate.

Frequently it is beneficial to utilize in the preparation of the expandable particles a di-functional monomer or cross linking agent which serves to increase the melt or flow viscosity of the polymeric composition at temperatures sufficiently high to cause volatilization of the blowing agent and subsequent deformation of the originally formed sphere into a larger hollow sphere.

In the preparation of expandable particles, usually it is most advantageous to prepare them by polymerizing the monomeric materials to a relatively low molecular weight if maximum expansion of the particles is desired. For example, greater expansion under similar conditions will be obtained from particles prepared utilizing 4 percent by weight based on the monomer of a free radical generating catalyst than if one percent by weight of the catalyst is employed. The lower molecular weight material usually tends to expand to greater volume than does the higher molecular weight material. This is presumed to be due to the difference in the flow characteristics of the thermoplastic resins as the molecular weight varies. If the polymerization conditions are such that a cross linked nonthermoplastic resin is prepared there can be little or no expansion. If the opposite extreme of molecular weight is employed wherein a very low molecular weight resin is utilized, expansion can occur but the product usually is of relatively low strength and oftentimes of limited value. If the diffusion rate of blowing agent through a polymer varies with the composition of the polymer as well as its molecular weight the optimum quantity of blowing agent to be incorporated within a particular particle for expansion will vary accordingly. Thus, if particles of a given diameter are prepared, some from a polymer having a relatively high diffusion rate of the blowing agent through the cell wall a greater quantity of blowing agent will be required than in a particle of similar dimensions and having similar thermoplastic properties. This optimum ratio will vary as the particle diameter varies. A small particle will generally require a larger quantity of blowing agent than will a larger particle as the thickness of the wall initially is less and on expansion becomes proportionately thinner. Thus the diffusion rate through the wall of a small particle having a given polymer to blowing agent rate ratio is significantly greater than that for a particle having 3 or 4 times its diameter. Thus in the instance of particles having a relatively high percentage of blowing agent which are small in diameter substantially less expansion can be expected than for a particle initially containing less blowing agent and more polymer. That is, the optimum polymer raising agent ratio for each polymer blowing agent combination is dependent on particle size. For example, methyl methacrylate particles containing neopentane and having a diameter of about 10 microns have for optimum expansion approximately a ratio of 1:1 blowing agent to polymer.

For purposes of the present invention, it is preferred that the particles used are those consisting of 75 percent by weight acrylonitrile and 25 percent by weight vinylidene chloride.

The best method for preparing the ablative coating of the present invention is to first add the silica (B) and/or the high temperature decomposing fiber (C), if used, to the silicone elastomer (A). A homogeneous mixture is obtained by use of standard mixing equipment and the unblown particle (D) is then added. The entire admixture is then heated to a temperature of from about 90° C. to about 135° C., the specific temperature being dependent upon the exact nature and structure of the particle (D) as well as time of exposure. The curing agent for the elastomer (A) is then suitably added to the above mixture and the finished ablative coating is then applied to the pertinent surface.

The compositions of this invention can be applied to the surface of the aerospace vehicle or its support equipment by any convenient method and thereafter cured. Thus, the compositions can be sprayed on, formed in place, or trowelled or buttered upon the surface. The thickness of the coating varies depending upon the heat flux to be encountered during use. Ordinarily the greater the heat flux, the thicker the coating.

The following examples are illustrative only and should not be construed as limiting the invention which is properly delineated in the appended claims.

EXAMPLE 1

The effectiveness of the compositions of this invention as ablative coatings was shown by subjecting samples of the cured elastomeric compositions to the flame of a Kerosine-oxygen torch adjusted to give a reducing flame having a temperature of between 5000° F. and 6000° F. and a velocity of about 5,500 feet per second. The sample was positioned in the flame at a location to provide a heat flux of 100 Bt.u./ft.$^2$ sec. This subjects the sample to high temperatures and the deleterious effects of tubulent gases. Compositions were compounded into the formulations shown below and in each case the composition was cured into a slab about 1.5 x 4 inches. The composition was vulcanized and the sample subjected to the flame of the torch for 30 seconds.

The performance index (which is the figure of importance) was then determined employing rate of penetration in conjunction with specific gravity according to the formula $$PI = \frac{100}{SpGr \times PR}$$

In the present example and the examples which follow, the monocellular thermoplastic, resinous polymeric particle consists of 75 percent by weight acrylonitrile and 25 percent by weight vinylidene chloride and was prepared in the following manner:

A polymerization reaction was charged with 100 parts of deionized water and 15 grams of a 30 percent by weight colloidal silica dispersion. To this mixture was added 2½ parts of a copolymer prepared from diethanol amine and adipic acid in equimolar proportions to give a product having a viscosity of about 5 centipoises at 25° C. One (1) part of a solution containing 2½ percent potassium dichromate was added to the polymerization reactor. The pH of the aqueous mixture was adjusted to 4 by addition of hydrochloric acid. Seventy-seven (77) parts of a monomer mixture comprising 75 percent by weight of acrylonitrile and 25 percent by weight of vinylidene chloride was catalyzed with one-half to 1 percent of 2,2-azo-bis-isobutyro nitrile. To this monomer mixture was added 23 weight percent (30.3 volume percent) based on the weight of the oil phase of neopentane. The reaction mixture was subjected to violent agitation by a blade rotating at a speed of about 10,000 r.p.m. A portion of the contents was sampled to determine particle size and the reactor immediately sealed. The monomer neopentane droplets appeared to have diameters ranging from about 2 to about 5 microns. The reaction mixture was maintained at a temperature of about 55° C. for a period of 24 hours. Gentle agitation was maintained during this reaction period and at the end of the reaction period, the temperature of the mixture was lowered to about 30° C. The reaction mixture had a chalky-white appearance similar to milk. A portion of the mixture was filtered to remove the small beads. The particles prior to heating, appeared under a light microscope to have a fine structure to the surface, and contained a liquid center of neopentane.

The results are shown in the table below.

Sample 1—100 parts [1] of a vinyl endblocked copolymer of 70 mol percent dimethylsiloxane and 30 mol percent phenylmethylsiloxane, 8 parts carbon fibers, 10 parts of the monocellular thermoplastic, resinous polymeric particle and 20 parts of a mixture consisting of 73.5 parts of a vinyl containing polydimethylsiloxane, 25.0 parts of a copolymer of $(CH_3)_2HSiO_{0.5}$, $(CH_3)_3SiO_{0.5}$, $(CH_3)_2SiO$ and $CH_3HSiO$ units and 1.5 parts of a methylvenylsiloxane polymer. A platinum catalyst was added and this sample was prepared by mixing the above ingredients until a uniform mass was obtained.

Sample 2—Sample 2 was identical to Sample 1 except that it contained 5.0 parts of the monocellular thermoplastic resinous polymeric particle.

Sample 3—Sample 3 was identical to Sample 2 except that it also cointained 25 parts of silica.

Sample 4—Sample 4 was identical to Example 2 except that it contained 50 parts of silica.

TABLE I

| Sample: | Density, pcf. | Performance index |
|---|---|---|
| 1 | 20 | 38.0 |
| 2 | 30 | 35.0 |
| 3 | 40 | 34.5 |
| 4 | 50 | 29.9 |

The above data amply illustrates that a wide range of densities may be obtained by varying the necessary ingredients of the ablative coating without significantly altering the Performance Index.

EXAMPLE 2

A formulation indentical to that described in Sample 1 of Example 1 was prepared. A second sample was prepared substituting 30 parts of hollow carbon particles of the monocellular thermoplastic, resinous polymeric par-

---

[1] Parts are parts by weight.

ticle and a third sample was prepared substituting 15 parts of hollow glass particles for the monocellular thermoplastic, resinous polymeric particle.

The resulting samples were all prepared such that they were of equal consistency and thus, possessed equal handling characteristics.

The first sample had a density (pounds/ft.$^3$) of 24.0 and a Performance Index of 38.5; the second sample had a density of 52.8 and a Performance Index of 30.0; and the third sample had a density of 52.4 and a performance index of 35.4.

The above clearly demonstrates that the ablative coating of the instant invention in comparison with prior art ablative coatings is far superior in important aspects. That is, handling characteristics being equal, a significantly lower density is achieved while also achieving superior ablative performance as measured by the performance index.

In addition, char adhesion (which is important in providing protection in a high shear environment) was measured by ease of char removal after test. The first sample had excellent char adhesion whereas the second and third sample had extremely poor char adhesion.

EXAMPLE 3

When the following amounts of silica and a high temperature decomposing fiber were included in the formulation of the first sample of Example 2 and when the amount of the monocellular thermoplastic, resinous polymeric particle was varied as set forth below and the formulations evaluated in accordance with the procedures described in Example 2, equivalent results were obtained.

(A) 25 parts of silica, 5 parts high temperature decomposing fiber, and 20 parts monocellular thermoplastic, resinous polymeric particle.

(B) 100 parts silica, 15 parts high temperature decomposing fiber, and 50 parts monocellular thermoplastic resinous polymeric particle.

(C) 250 parts silica, 1.0 part high temperature decomposing fiber, and 25 parts monocellular thermoplastic, resinous polymeric particle.

That which is claimed is:

1. A metal substrate having coated on the surface thereof a composition consisting of
   (A) a silicone elastomer,
   (B) from 0 to 250 parts by weight of silica,
   (C) from 0 to 15 parts by weight a high temperature decomposing fiber which melts at a temperature of above 1500° F.,
   (D) from 1.0 to 50 parts by weight of a monocellular thermoplastic, resinous polymeric particle having a generally spherical shape and having encapsulated therein a discrete portion of a volatile liquid raising agent which becomes gaseous at a temperature below the softening point of the polymer, said parts of (B), (C), and (D) being based on each 100 parts by weight of organosiloxane polymer in (A), said composition being present in an amount sufficient to protect said substrate from the deleterious effects of gases at temperatures above 1500° F.

2. The metal substrate as recited in claim 1 in which there is from 0 to about 50 parts by weight of (B).

3. The metal substrate as recited in claim 2 in which there is from 0 to about 10 parts by weight of (C).

4. The metal substrate as recited in claim 3 in which there is from about 5 to about 25 parts by weight of (D).

5. The metal substrate as recited in claim 1 in which there is 0 part by weight of (B), about 8 parts by weight of (C), and about 10 parts by weight of (D).

6. The metal substrates as recited in claim 1 in which (C) is a carbor fiber and (D) consists of 75 percent by weight acrylonitrile and 25 percent by weight vinylidene chloride.

References Cited

UNITED STATES PATENTS

| | | | |
|---|---|---|---|
| 3,317,455 | 5/1967 | Blome et al. | 260—37 |
| 3,429,838 | 2/1969 | Hersch | 117—132 X |
| 3,600,341 | 8/1971 | Schmidt et al. | 260—37 X |
| 3,489,579 | 1/1970 | Steverding | 106—52 |
| 3,210,233 | 10/1965 | Kummer et al. | 161—68 |
| 3,475,262 | 10/1969 | Sargent et al. | 161—68 |
| 3,268,359 | 8/1966 | Boyd et al. | 117—132 |
| 3,364,065 | 1/1968 | Cutright | 260—37 X |
| 3,455,732 | 7/1969 | Hathaway | 260—37 X |
| 3,506,607 | 4/1970 | Bobear | 260—37 |
| 3,623,904 | 11/1971 | Ramseyer | 117—6 |

FOREIGN PATENTS

| | | | |
|---|---|---|---|
| 752,451 | 2/1967 | Canada | 117—161 |

WILLIAM D. MARTIN, Primary Examiner

H. J. GWINNELL, Assistant Examiner

U.S. Cl. X.R.

117—6, 135.1, 161 2A